US008828556B2

(12) United States Patent
Shimizu et al.

(10) Patent No.: US 8,828,556 B2
(45) Date of Patent: Sep. 9, 2014

(54) PIPE PROVIDED WITH CORROSION PREVENTION LAYER ON THE OUTSIDE SURFACE

(75) Inventors: Hiroaki Shimizu, Amagasaki (JP); Goro Funahashi, Amagasaki (JP); Hiroaki Fujii, Amagasaki (JP)

(73) Assignee: Kuboto Corporation, Osaka (JP)

( * ) Notice: Subject to any disclaimer, the term of this patent is extended or adjusted under 35 U.S.C. 154(b) by 333 days.

(21) Appl. No.: 12/733,569

(22) PCT Filed: Mar. 18, 2009

(86) PCT No.: PCT/JP2009/001193
§ 371 (c)(1),
(2), (4) Date: Mar. 9, 2010

(87) PCT Pub. No.: WO2009/119044
PCT Pub. Date: Oct. 1, 2009

(65) Prior Publication Data
US 2010/0193063 A1    Aug. 5, 2010

(30) Foreign Application Priority Data

Mar. 24, 2008 (JP) .................................. 2008-074781
May 26, 2008 (JP) .................................. 2008-136141

(51) Int. Cl.
| C22C 18/00 | (2006.01) |
| F16L 58/08 | (2006.01) |
| C23C 4/04 | (2006.01) |
| C23C 4/08 | (2006.01) |
| C23C 4/12 | (2006.01) |
| B22D 11/00 | (2006.01) |
| B22D 11/06 | (2006.01) |

(52) U.S. Cl.
CPC ............... *B22D 11/005* (2013.01); *C23C 4/04* (2013.01); *C23C 4/08* (2013.01); *B23B 15/013* (2013.01); *C23C 4/121* (2013.01); *C23C 4/125* (2013.01); *B22D 11/0611* (2013.01)
USPC ........................................................ 428/659

(58) Field of Classification Search
None
See application file for complete search history.

(56) References Cited

U.S. PATENT DOCUMENTS

| 1,876,156 | A | * | 9/1932 | Thompson | ..................... | 205/244 |
| 5,960,835 | A | * | 10/1999 | Izaki et al. | ..................... | 138/145 |
| 6,187,116 | B1 | * | 2/2001 | Gilles | ........................... | 148/441 |

(Continued)

FOREIGN PATENT DOCUMENTS

| JP | 2001-355051 | 12/2001 | ............... C23C 2/06 |
| JP | 2005-126795 | 5/2005 | ............... C23C 4/12 |

(Continued)

OTHER PUBLICATIONS

English machine translation of JP 2001-355051 dated May 4, 2013.*
Japanese Office Action issued in connection with corresponding Japanese Patent Application No. 2009-125910, dated Feb. 25, 2014.

*Primary Examiner* — Adam Krupicka
(74) *Attorney, Agent, or Firm* — Kusner & Jaffe

(57) ABSTRACT

Disclosed is a pipe made of an iron-base material, having a corrosion prevention layer formed on the surface thereof. The corrosion prevention layer includes a Zn—Sn sprayed coating including Sn in a content of more than 1% by mass and less than 50% by mass and the balance composed of Zn. Alternatively, the corrosion prevention layer includes a Zn—Sn—Mg sprayed coating including Sn in a content of more than 1% by mass and less than 50% by mass, Mg in a content of more than 0.01% by mass and less than 5% by mass and the balance composed of Zn. Preferably, the sprayed coating of the corrosion prevention layer includes at least any one of Ti, Co, Ni and P, and the content of each of these elements is more than 0.001% by mass and less than 3% by mass.

1 Claim, 3 Drawing Sheets

(56) References Cited

U.S. PATENT DOCUMENTS

2003/0183626 A1* 10/2003 Tomimura et al. ........... 220/4.14
2004/0258949 A1* 12/2004 Honda et al. .................. 428/659
2006/0003180 A1* 1/2006 Goto et al. .................... 428/648

FOREIGN PATENT DOCUMENTS

| JP | 2006-169607 | 6/2006 | ............ C23C 30/00 |
| JP | 2007-146291 | 6/2007 | ............ C23C 4/06 |
| WO | WO 2007/114344 | 3/2007 | ............ B22D 11/00 |

* cited by examiner

[Specimen 1: Without water cooling]

[Specimen 4: With water cooling]

PIPE PROVIDED WITH CORROSION PREVENTION LAYER ON THE OUTSIDE SURFACE

TECHNICAL FIELD

The present invention relates to a pipe provided with a corrosion prevention layer on the outside surface thereof, a process for production of the pipe and a process for production of alloy wires used for the corrosion prevention layer, in particular, a pipe provided with a corrosion prevention layer on the outside surface thereof wherein the corrosion prevention layer is formed with a metal sprayed coating on the surface of the pipe made of an iron-base material, such as a cast-iron pipe, a process for production of the pipe, and a process for production of alloy wires to be used for the corrosion prevention layer.

BACKGROUND ART

Metal pipes practically used as laid underground have been provided with tar or bitumen coating since long ago for the purpose of corrosion prevention. When the coating of a metal pipe is scratched, however, the corrosion of the metal pipe progresses from the scratched portions. For the purpose of solving such a corrosion problem, the following corrosion prevention is widely applied: a metal coating having a higher ionization tendency than the ionization tendency of the material of a metal pipe is formed on the surface of the metal pipe, the metal coating undergoes the generation of a sacrificial anode function due to the ionization tendency difference, and thus the metal coating prevents the corrosion starting from the scratched portions. Zinc is a typical metal having such a sacrificial anode function. A zinc coating is formed on the surface of a metal pipe such as an iron pipe by plating or spraying. Such a coating is used, as it is, as the outermost surface layer, or as it is further overcoated with another layer. Zinc has a high ionization tendency; the electrochemical potential difference between iron and zinc is large, and accordingly, in a case where zinc is used in combination with an iron-base metal, even when some scratches are caused in the coating, the sacrificial anode function is displayed and the corrosion in the scratched portions can be suppressed. In the case of cast-iron pipes widely used as water and sewage pipelines, the coating is covered with a polyethylene sheet referred to as a polyethylene sleeve to block the coating from the external environment, and consequently the corrosion prevention effect is further enhanced.

However, zinc has a high ionization tendency, and hence zinc hardly maintains the sacrificial anode function over a long period of time. As a solution to solve this problem, the increase of the zinc coating amount is an effective technique. However, in this case, in addition to the increase of the material cost, the work time is increased and the production efficiency is also degraded.

Alternatively, as another method, a zinc-aluminum alloy is used (WO94/19640) as the case may be. The addition of aluminum alleviates the ionization, and consequently the retention time of the sacrificial anode effect is maintained over a longer period of time.

However, as for aluminum, health concern is raised from some viewpoints, and the safety of aluminum as a material applied to drink water supply pipes is not established. For example, in a pipe joint having an inserting-receiving structure in which the inside of a socket formed at one end of a pipe receives a spigot formed at one end of another pipe, the outer surface of the spigot is brought into contact with tap water, thus causing a possibility that aluminum is eluted from the outer surface of the spigot.

DISCLOSURE OF THE INVENTION

Problems to be Solved by the Invention

An object of the present invention is to provide a solution enabling to solve the above-described technical problems without drastically increasing the coating amount or without using aluminum.

Means for Solving the Problems

For the purpose of achieving the above-described object, the pipe provided with a corrosion prevention layer on the outside surface thereof, of the present invention, is a pipe wherein: the corrosion prevention layer is formed on the surface of the pipe made of an iron-base material; and the corrosion prevention layer includes either one of a Zn—Sn alloy sprayed coating including Sn in a content of more than 1% by mass and less than 50% by mass and the balance composed of Zn and a Zn—Sn—Mg alloy sprayed coating including Sn in a content of more than 1% by mass and less than 50% by mass, Mg in a content of more than 0.01% by mass and less than 5% by mass and the balance composed of Zn.

The alloy sprayed coating of the corrosion prevention layer of the pipe provided with a corrosion prevention layer on the outside surface thereof of the present invention, preferably includes at least any one of Ti, Co, Ni and P, and the content of each of Ti, Co, Ni and P is more than 0.001% by mass and less than 3% by mass.

A process for production of a pipe provided with a corrosion prevention layer on the outside surface thereof of the present invention includes, when the pipe provided with a corrosion prevention layer on the outside surface thereof is produced, heat treating the alloy sprayed coating at a temperature equal to or higher than the eutectic temperature of the alloy and lower than the melting point of the alloy.

Another process for production of a pipe provided with a corrosion prevention layer on the outside surface thereof of the present invention includes, when the pipe provided with a corrosion prevention layer on the outside surface thereof is produced, using one of a Zn—Sn wire, a Zn—Sn—Mg wire and a wire produced by including at least any one of Ti, Co, Ni and P in one of a Zn—Sn wire and a Zn—Sn—Mg wire as a first wire and a Zn wire as a second wire; and simultaneously arc spraying the first wire and the second wire.

A process for production of an alloy wire of the present invention includes: melting a material including Sn in a content of more than 1% by mass and less than 50% by mass, Mg in a content of more than 0.01% by mass and less than 5% by mass and the balance composed of Zn; and cooling the molten alloy under solidification, obtained by the melting, at a cooling rate of 20° C./sec or more from a temperature equal to and higher than the eutectic temperature of the Zn—Sn—Mg alloy down to a temperature of 50° C. or lower while the molten alloy is being solidified so as to yield a wire rod type cast product with a continuous casting machine.

According to the process for production of an alloy wire of the present invention, cooling water is preferably sprayed onto the molten alloy under solidification so as to yield a wire rod type cast product.

Advantages of the Invention

According to the pipe provided with a corrosion prevention layer on the outside surface thereof of the present invention, the corrosion prevention layer on the outside surface of a pipe made of an iron-base material includes a Zn—Sn alloy sprayed coating or a Zn—Sn—Mg alloy sprayed coating, and hence the corrosion prevention performance can be drastically improved as compared to a pipe using a simple zinc sprayed coating; additionally, Al is not used and hence no problems associated with health are caused. Moreover, Sn, which is soft, is used, and hence the Zn—Sn alloy or the Zn—Sn—Mg alloy can be easily worked into a Zn—Sn wire or a Zn—Sn—Mg wire, respectively, and consequently a spray material can be formed without any problem.

According to the present invention, the alloy sprayed coating includes at least any one of Ti, Co, Ni and P in a predetermined content, and hence the corrosion prevention performance can be more improved.

According to the present invention, the alloy sprayed coating is heat treated at a temperature equal to or higher than the eutectic temperature of the alloy and lower than the melting point of the alloy, and hence the corrosion prevention performance can be more improved.

According to the present invention, one of a Zn—Sn wire, a Zn—Sn—Mg wire and a wire produced by including at least any one of Ti, Co, Ni and P in one of a Zn—Sn wire and a Zn—Sn—Mg wire is used as a first wire and a Zn wire is used as a second wire, and simultaneously the first wire and the second wire are arc sprayed, and hence the corrosion prevention performance can be furthermore improved.

According to the present invention, a molten Zn—Sn—Mg alloy under solidification is quenched from a temperature equal to or higher than the eutectic temperature of the Zn—Sn—Mg alloy down to a temperature of 50° C. or lower while the molten alloy is being solidified so as to yield a wire rod type cast product with a continuous casting machine, and hence the zinc crystals can be refined, and accordingly the mechanical properties of the alloy wire can be improved. Thus, a Zn—Sn—Mg alloy wire to be hardly broken in a wiredrawing step can be produced.

BEST MODE FOR CARRYING OUT THE INVENTION

Figure 1:
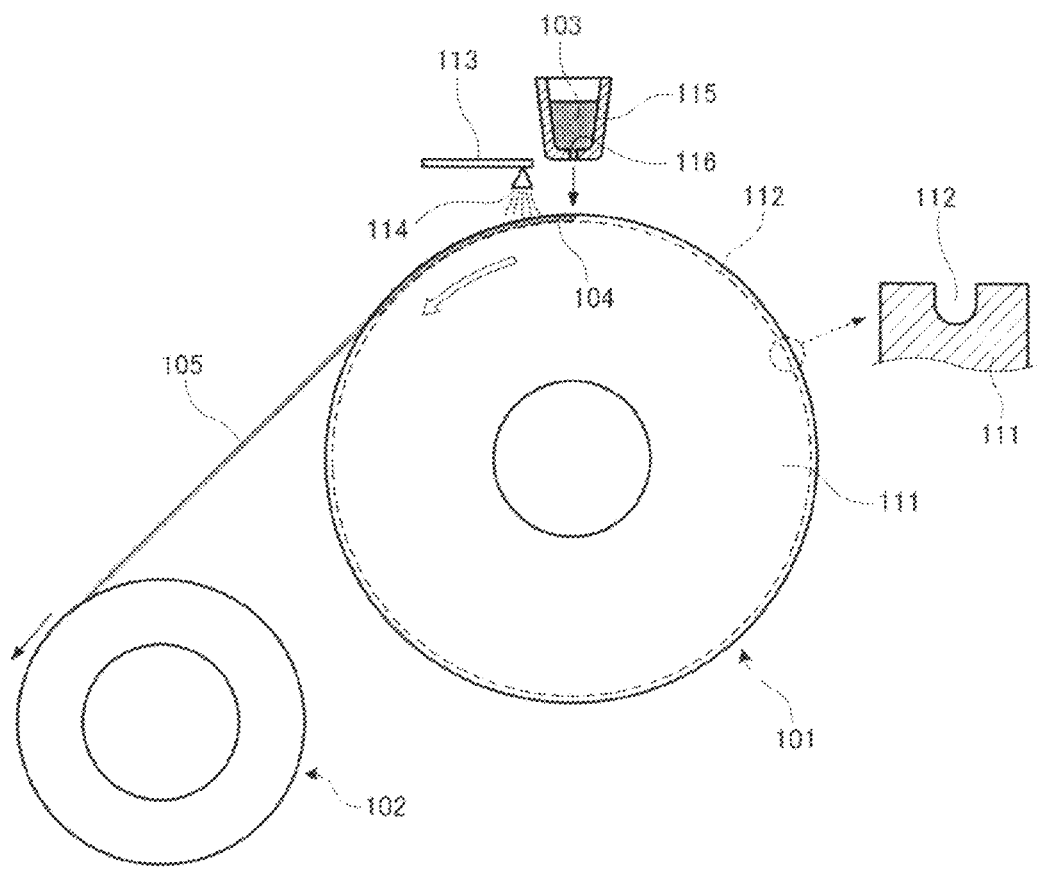
FIG. 1 is a view illustrating a production apparatus used for a process of production of an alloy wire of the present invention.

The pipe provided with a corrosion prevention layer on the outside surface thereof of the present invention is a pipe in which a corrosion prevention layer including an alloy sprayed coating is formed on the surface of a pipe made of an iron-base material, such as a cast-iron pipe.

In a first aspect of the present invention, the alloy sprayed coating is formed with a Zn—Sn alloy sprayed coating including Sn in a content of more than 1% by mass and less than 50% by mass and the balance composed of Zn. By adopting an alloy sprayed coating formed by adding Sn to predominant Zn, the corrosion prevention performance can be improved as compared to a sprayed coating using only Zn. The corrosion prevention performance of the Zn—Sn alloy sprayed coating can be made approximately the same as the corrosion prevention performance of Zn-15Al (Zn: 85% by mass, Al: 15% by mass). When the content of Sn is 1% by mass or less, or when the content of Sn is 50% by mass or more, no substantial improvement effect of the corrosion prevention performance due to the addition of Sn can be obtained.

The inclusion of Sn also provides an advantage that white rust, namely, a corrosion product of Zn hardly occurs. In the case where white rust tends to occur, when a product having a black paint coating applied onto a sprayed coating is stored outdoors and white rust is generated in the black paint coating portion, such white rust shows up so clearly to result in a problem that recoating is necessary at the time of shipping.

The inclusion of Sn, which is a soft material, also provides an advantage that the production of the Zn—Sn alloy wire as a material for spraying is facilitated. Additionally, such a Zn—Sn alloy includes only Zn and Sn, and hence causes no problem associated with health.

In a second aspect of the present invention, the alloy sprayed coating is formed with a Zn—Sn—Mg alloy sprayed coating including Sn in a content of more than 1% by mass and less than 50% by mass, Mg in a content of more than 0.01% by mass and less than 5% by mass and the balance composed of Zn.

Also in this case, as compared to a sprayed coating using only Zn, the corrosion prevention performance can be improved. The corrosion prevention performance of the Zn—Sn—Mg alloy sprayed coating can be made approximately the same as or higher than the corrosion prevention performance of Zn-15Al (Zn: 85% by mass, Al: 15% by mass).

When the content of Sn is 1% by mass or less and/or when the content of Mg is 0.01% by mass or less: no substantial improvement effect of the corrosion prevention performance due to the addition of Sn and Mg can be obtained. On the other hand, also when the content of Sn is 50% by mass or more and/or when the content of Mg is 5% by mass or more, similarly no substantial improvement effect of the corrosion prevention performance due to the addition of Sn and Mg can be obtained.

In the same manner as in the formation of the Zn—Sn alloy sprayed coating, the formation of the Zn—Sn—Mg alloy sprayed coating also provides the advantages that white rust hardly occurs, wires are easily produced and no problem associated with health occurs.

In the alloy sprayed coatings of the first and second aspects of the present invention, at least any one of Ti, Co, Ni and P can be included; in other words, any one, or any two to four, in combination, of these elements can be included. The content of each of these elements is preferably 0.001% by mass or more and 3% by mass or less. The inclusion of these elements in addition to Sn or Sn—Mg correspondingly reduces the amount of Zn.

The inclusion of these elements enables to further improve the corrosion prevention performance. However, when the content of each of these elements is less than 0.001% by mass, no substantial improvement effect of the corrosion prevention performance due to the addition of these elements can be obtained. On the other hand, also when the content of each of these elements is more than 3% by mass, no substantial improvement effect of the corrosion prevention performance due to the addition of these elements can be obtained.

In the same manner as described above, the inclusion of these elements provides the advantages that white rust hardly occurs, and because of the small contents of these elements, alloy wires can be produced without problems and no problem associated with health occurs.

The pipe provided with a corrosion prevention layer on the outside surface thereof of the present invention is a pipe in which the corrosion prevention layer includes the above-described alloy sprayed coating. The corrosion prevention layer is particularly preferably such that in addition to the alloy sprayed layer, another coating such as an overcoating is laminated on the alloy sprayed coating. The overcoating can be performed with an acrylic resin coating material or an epoxy resin coating material.

Next, description is made on the process for production of a pipe provided with a corrosion prevention layer on the outside surface thereof of the present invention, namely, the process for formation of an alloy sprayed coating. Examples of the process for formation of an alloy sprayed coating on the surface of a cast-iron pipe may include a known spraying method, namely, a method in which a Zn—Sn wire, a Zn—Sn—Mg wire or a wire produced by adding at least any one of Ti, Co, Ni and P to one of these wires is used and an arc spraying is applied. Alternatively, a spraying with an alloy powder, instead of a wire, can also be adopted.

As an alternative to the above description, the Zn—Sn alloy sprayed coating is also able to be obtained by a technique in which a Zn—Sn wire or a wire produced by adding to this wire at least any one of Ti, Co, Ni and P is used as a first wire and a Zn wire is used as a second wire, and simultaneously the first wire and the second wire are arc sprayed. Similarly, the Zn—Sn—Mg alloy sprayed coating is also able to be obtained by a technique in which a Zn—Sn—Mg wire or a wire produced by adding to this wire at least any one of Ti, Co, Ni and P is used as a first wire and a Zn wire is used as a second wire, and simultaneously the first wire and the second wire are arc sprayed.

For example, for the purpose of obtaining a Zn-25Sn-0.5Mg (Sn: 25% by mass, Mg: 0.5% by mass, Zn: the balance; hereinafter, similar representations are adopted, as the case may be) alloy sprayed coating, instead of performing a simultaneous arc spraying by using two strings of a Zn-25Sn-0.5Mg wire, a simultaneous arc spraying by using a Zn-50Sn-1.0Mg wire and a Zn wire in equal amounts can also be performed.

In this way, the corrosion prevention performance can be further improved. On the other hand, the use amount of the Zn—Sn—Mg wire can be halved, and hence the cost required for the preparation of the wire can be reduced.

The reason for the fact that the adoption of such a spray method further improves the corrosion prevention performance is not clear, but can be probably attributed to each of or a synergetic effect of the following (a), (b) and (c).

(a) For example, when the simultaneous arc spraying is performed by using the Zn—Sn—Mg alloy wire and the Zn wire, the Zn—Sn—Mg alloy and Zn are both distributed in the sprayed coating thus formed. In this case, the Zn—Sn—Mg alloy is lower in electric potential than Zn, and when the Zn—Sn—Mg alloy and Zn each function as a sacrificial anode, the Zn—Sn—Mg alloy preferentially begins to be eluted. The thus eluted Zn—Sn—Mg alloy forms another relatively stable coating on the surface of the coating, this stable coating probably suppresses the consumption or elution of the rest of the Zn—Sn—Mg alloy and Zn, and thus the corrosion prevention performance is probably further improved.

(b) The presence of Zn in the coating offers a physical hindrance to suppress the elution of the Zn—Sn—Mg alloy, alternatively in the case where the Zn—Sn—Mg alloy is eluted, the corrosion product of the Zn—Sn—Mg alloy suppresses the elution of Zn, and thus the corrosion prevention performance is probably further improved.

(c) According to the observation of the present inventors, the porosity of a Zn-25Sn-0.5Mg sprayed coating obtained by using two stirrings of a Zn-25Sn-0.5Mg wire was found to be about 15%; on the other hand, the porosity of another Zn-25Sn-0.5Mg sprayed coating obtained by using a Zn-50Sn-1.0Mg wire and the Zn wire in equal amounts was found to be about 12%. In other words, from the lower porosity of the latter coating, the corrosion prevention performance is probably improved in the latter coating. The lower porosity may be attributed to the effect of the use of the wires different in hardness from each other on the basis of the fact that the Zn-50Sn-1.0Mg wire is softer than the Zn wire.

In the production of the pipe provided with a corrosion prevention layer on the outside surface thereof of the present invention, preferably an alloy sprayed coating is formed on a cast-iron pipe, and then the alloy sprayed coating is heat treated at a temperature equal to or higher than the eutectic temperature (198° C.) of the alloy and lower than the melting point of the alloy. The application of such a heat treatment enables to further improve the corrosion prevention performance. This is presumably because only Sn is melted by the heat treatment at a temperature higher than the eutectic temperature of the Zn—Sn alloy or the Zn—Sn—Mg alloy, thus the fine voids having been created in the sprayed coating are filled with the molten Sn, and consequently a cast-iron pipe provided with such a coating is capable of suppressing the penetration of electrolytes into the coating when the cast-iron pipe is laid underground.

Accordingly, a heat treatment at a temperature lower than the eutectic temperature substantially does not melt Sn, and hence the above-described effect is not able to be obtained. On the other hand, the heat treatment temperature is higher than the melting point of the alloy sprayed coating, the oxidation of the alloy is made to progress and the intrinsic corrosion prevention performance is lost.

The heat treatment time is not particularly limited; however, the heat treatment time is preferably 1 second to 60 minutes. When the heat treatment time is shorter than this range, the treatment time is insufficient and no necessary heat treatment can be performed.

When the above-described overcoating is performed, the overcoating is performed after the alloy sprayed coating is formed.

Hereinafter, the process for production of the Zn—Sn—Mg alloy wire is described.

Various processes for production of alloy wires for use in metal spray have been known. However, any common production processes include a wiredrawing step in which a wire having a predetermined cross-sectional shape is drawn to be worked into an alloy wire having a predetermined wire diameter. In other words, a working step of reducing the diameter of a wire is included. In this case, when the material for the wire is low in strength or ductility, wire breakage may occur. For the purpose of coping with such breakage, a treatment such as a heat treatment may be performed depending on the material for the wire. In particular, in the case of the Zn—Sn—Mg alloy wire, when the content of Sn is small, the wire is somewhat brittle, accordingly the workability is degraded and hence the wire breakage may occur in the wiredrawing step as described above.

The process for production of the Zn—Sn—Mg alloy wire of the present invention is a production process which hardly causes wire breakage in the wiredrawing step.

This production process, as described above, includes: melting a material including Sn in a content of more than 1% by mass and less than 50% by mass, Mg in a content of more than 0.01% by mass and less than 5% by mass and the balance composed of Zn; and cooling the molten alloy under solidification, obtained by the melting, at a cooling rate of 20° C./sec or more from a temperature equal to or higher than the eutectic temperature of the Zn—Sn—Mg alloy down to a temperature of 50° C. or lower while the molten alloy is being solidified so as to yield a wire rod type cast product with a continuous casting machine. In this way, the zinc crystals can be refined to improve the mechanical properties of the alloy wire. Consequently, a Zn—Sn—Mg alloy wire which is hardly broken in the wiredrawing step can be produced.

The details of this production process are described. FIG. 1 illustrates the configuration of a production apparatus for embodying this production process. This apparatus includes a continuous casting machine 101 and a take-up unit 102. In the casting machine 101, a groove 112 having a U-shaped cross-section is formed on the circumference of the rotary casting wheel 111. A crucible 115 is disposed above the casting wheel 111. The crucible 115 is capable of storing the molten alloy 103 of the Zn—Sn—Mg alloy in the interior thereof and a molten alloy outlet 116 is formed at the bottom of the crucible 115. In the vicinity of the crucible 115, a spray nozzle 113 is disposed, and the spray nozzle 113 is equipped with a spout 114 for spraying cooling water.

In the production, while the casting wheel 111 is being rotated slowly, the molten alloy 103 is fed to the portion of the groove 112 which portion is located on the top of the casting wheel 111, from the crucible 115. Then, the molten alloy 103 begins to be solidified due to the heat removal by the casting wheel 111. Immediately after the start of the solidification, cooling water is sprayed from the spray nozzle 113 onto the molten alloy 104 under solidification inside the groove 112.

In this way, the molten alloy 104 under solidification is quenched to produce an alloy wire 105. The alloy wire 105 is formed by the quenching of the molten alloy 104 under solidification, hence the crystals are refined and consequently the ductility of the alloy wire 105 can be improved. The obtained alloy wire 105 is taken up by the take-up unit 102.

The quenching by spraying cooling water from the spray nozzle 113 onto the molten alloy under solidification 104 is preferably conducted as immediately as possible after the casting of the molten alloy 103 into the groove 112. For the purpose of attaining the improvement of the ductility due to the crystal refining, it is required to adopt the cooling conditions that the cooling is performed at a cooling rate of 20° C./sec or more from a temperature equal to or higher than the eutectic temperature of the Zn—Sn—Mg alloy, namely, 198° C., down to a temperature of 50° C. or lower.

In addition to the above-described water cooling, as long as a cooling technique can adopt the above-described cooling conditions, the cooling technique may be an air cooing using cold air, or alternatively a cooling using another fluid.

The alloy wire 105 taken up by the take-up unit 102 is subsequently subjected to the wiredrawing step.

EXAMPLES

Hereinafter, Examples of the present invention are described. It is to be noted that in following Examples, Comparative Examples, the evaluations of various physical properties were performed as follows.

(1) Workability into Wire

An alloy ingot of 47 mm in diameter×350 mm in length was prepared and the workability into wire was evaluated by measuring the Vickers hardness. The alloy ingot after the hardness measurement was forged so as to have a reduced diameter of 10 mm and further wiredrawn so as to have a diameter of 1.6 mm, and thus the workability was evaluated on the basis of the following standards.

G(Good): Wiredrawing can be performed to a diameter of 1.6 mm.

P(Poor): Breakage occurs during wiredrawing.

(2) Corrosion Resistance

A corrosion resistance test was performed in the following manner. Specifically, a 150 mm×70 mm×2 mm sand-blast steel plate was used as a specimen. On this plate, a 20 to 30-μm thick sprayed coating was formed at a spray amount of 130 g/m$^2$ by an electric arc spray technique using a wire having a diameter of 1.6 mm, and thus a test sample was prepared. The corrosion resistance test and the evaluation method are as follows.

(2-1)

The salt spray test specified in JIS Z2371 was performed. In each of the case where only the Zn—Sn alloy was sprayed and no heat treatment was applied and the case where only the Zn—Sn—Mg alloy was sprayed and no heat treatment was applied, the corrosion resistance was evaluated on the basis of the degree of white rust occurrence and the time period until red rust occurred. The degree of white rust occurrence was visually evaluated on the basis of the following standards.

G(Good): The degree of white rust occurrence is low.

A(Average): The degree of white rust occurrence is moderate.

P(Poor): The degree of white rust occurrence is high.

(2-2)

With respect to red rust, the evaluation was performed as follows. In the salt spray test for the case where only Zn was sprayed and no heat treatment was applied, the time period until red rust occurred was defined as "1". With reference to this definition, in each of the case where only the Zn—Sn alloy was sprayed and the case where only the Zn—Sn—Mg alloy was sprayed, the time period until red rust occurred in the salt spray test was numerically evaluated for a test sample to which no heat treatment was applied.

(2-3)

The time period until red rust occurred in the salt spray test was evaluated for the case where any one of Ti, Co, Ni and P was singly added and no heat treatment was applied. Specifically, in each of the Zn—Sn alloy free from the addition of these elements and the Zn—Sn—Mg alloy free from the addition of these elements, the time period until red rust occurred without application of a heat treatment was defined as "1"; with reference to this definition, the time period concerned was evaluated on the basis of the following standards.

E(Excellent): The time period until red rust occurred was longer by a factor of 1.5 or more.

G(Good): The time period until red rust occurred was longer by a factor of 1.0 or more and less than 1.5.

A(Average): The time period until red rust occurred was approximately 1.

(2-4)

The time period until red rust occurred in the salt spray test was evaluated for each of the case where only the Zn—Sn alloy was sprayed without adding Ti, Co, Ni and P and a heat treatment was applied and the case where only the Zn—Sn—Mg alloy was sprayed without adding Ti, Co, Ni and P and a heat treatment was applied. Specifically, for each of the test samples subjected to a heat treatment for 30 minutes, measurement was made on the heat treatment temperature range in which the time period until red rust occurred was made longer and the corrosion prevention effect was able to be evaluated as improved as compared to the corresponding case where no heat treatment was applied.

(2-5)

While a test sample free from the addition of Ti, Co, Ni and P and free from any heat treatment was being immersed in tap water at 30° C., the time period until red rust occurred was evaluated. Specifically, the time period until red rust occurred in a case where only Zn was sprayed was defined as "1"; for the test sample, with reference to this definition, the time period until red rust occurred was numerically evaluated.

(2-6)

While a test sample free from the addition of Ti, Co, Ni and P and free from any heat treatment was being immersed in sulfuric acid of pH 3 at 30° C., the time period until red rust occurred was evaluated. Specifically, the time period until red rust occurred in a case where only Zn was sprayed was defined as "1"; for the test sample, with reference to this definition, the time period until red rust occurred was numerically evaluated.

Details of Examples and Comparative Examples are as follows.

Examples 1 to 6 and Comparative Examples 1 to 4

The Zn—Sn alloys having the component compositions shown in Table 1 were sprayed to prepare the test samples of Examples 1 to 6 and Comparative Examples 1 to 4. The evaluation results of these test samples are shown in Table 1. In Comparative Examples 3, only Zn was sprayed and in Comparative Example 4, only Sn was sprayed.

TABLE 1

| | Components (% by mass) | | | Hardness (Hv) | Workability into wire | Degree of white rust occurrence [no heat treatment] | Time period until red rust occurred [no heat treatment] | Salt spray Evaluation of the time period until red rust occurred Addition amounts of Ti, Co, Ni and P (% by mass) [no heat treatment] | | | | | Heat treatment temperature range in which the corrosion prevention effect was improved (° C.) | Immersion in tap water Time period until red rust occurred [no heat treatment] | Immersion in sulfuric acid Time period until red rust occurred [no heat treatment] |
|---|---|---|---|---|---|---|---|---|---|---|---|---|---|---|---|
| | Zn | Sn | Mg | | | | | 0.001 | 0.01 | 0.1 | 1 | 3 | | | |
| Ex. 1 | Balance | 2 | — | 30 | G | G | 10 | A | G | E | G | A | 198-410 | 10 | 10-12 |
| Ex. 2 | Balance | 10 | — | 30 | G | G | 10 | A | G | E | G | A | 198-390 | 10 | 10-12 |
| Ex. 3 | Balance | 20 | — | 30 | G | G | 10-12 | A | G | G | G | A | 198-380 | 10-12 | 10-12 |
| Ex. 4 | Balance | 30 | — | 30 | G | G | 10-12 | A | G | G | G | A | 198-370 | 10-12 | 10-12 |
| Ex. 5 | Balance | 40 | — | 30 | G | G | 10 | A | G | E | G | A | 198-350 | 10 | 10-12 |
| Ex. 6 | Balance | 48 | — | 30 | G | G | 10 | A | G | E | G | A | 198-340 | 10 | 10-12 |
| Com. Ex. 1 | Balance | 1 | — | 35 | G | A | 2-3 | A | G | E | G | A | 198-410 | 2-3 | 2-3 |
| Com. Ex. 2 | Balance | 50 | — | 25 | G | G | 7-8 | A | G | E | G | A | 198-340 | 7-8 | 7-8 |
| Com. Ex. 3 | 100 | — | — | 35 | G | P | 1 | — | — | — | — | — | — | 1 | 1 |
| Com. Ex. 4 | — | 100 | — | 10 | G | G | <1 | — | — | — | — | — | — | <1 | <1 |

In Examples 1 to 6 and Comparative Examples 1 to 4, when Ti, Co, Ni and P were added and the salt spray test was performed, in any of the cases in which any one of Ti, Co, Ni and P was singly added, the same evaluation results were obtained, by varying the addition amount, on the time periods until red rust occurred. Therefore, in Table 1, for simplicity, only one typical example is shown for each of Examples and Comparative Examples. Specifically, Table 1 means that in each of Examples 1 to 6 and Comparative Examples 1 to 4, for any one of Ti, Co, Ni and P, when the addition amount thereof was varied as 0.001, 0.01, 0.1, 1 and 3% by mass, the same evaluation results were obtained for all these elements.

Examples 7 to 42 and Comparative Examples 5 to 18

The Zn—Sn—Mg alloys having the component compositions shown in Table 2 and Table 3 were sprayed onto the specimens to yield the test samples of Examples 7 to 42 and Comparative Examples 5 to 14. The evaluation results of the test samples of Examples 7 to 30 are shown in Table 2, and the evaluation results of the test samples of Examples 31 to 42 and Comparative Examples 5 to 18 are shown in Table 3. For reference, in each of Table 2 and Table 3, Comparative Examples 3 and 4 are again listed.

TABLE 2

| | Components (% by mass) | | | Hardness (Hv) | Workability into wire | Degree of white rust occurrence [no heat treatment] | Time period until red rust occurred [no heat treatment] | Salt spray — Evaluation of the time period until red rust occurred | | | | | Heat treatment temperature range in which the corrosion prevention effect was improved (° C.) | Immersion in tap water Time period until red rust occurred [no heat treatment] | Immersion in sulfuric acid Time period until red rust occurred [no heat treatment] |
|---|---|---|---|---|---|---|---|---|---|---|---|---|---|---|---|
| | | | | | | | | Addition amounts of Ti, Co, Ni and P (% by mass) [no heat treatment] | | | | | | | |
| | Zn | Sn | Mg | | | | | 0.001 | 0.01 | 0.1 | 1 | 3 | | | |
| Ex. 7 | Balance | 2 | 0.02 | 35 | G | G | 10-12 | A | G | G | G | A | 198-410 | 10-12 | 10-12 |
| Ex. 8 | Balance | 2 | 0.05 | 35 | G | G | 10-12 | A | G | G | G | A | 198-410 | 10-12 | 10-12 |
| Ex. 9 | Balance | 2 | 0.10 | 30 | G | G | 10-15 | A | G | G | G | A | 198-410 | 10-15 | 10-15 |
| Ex. 10 | Balance | 2 | 0.50 | 30 | G | G | 10-15 | A | G | G | G | A | 198-410 | 10-15 | 10-15 |
| Ex. 11 | Balance | 2 | 1.00 | 50 | G | G | 10-12 | A | G | G | G | A | 198-410 | 10-12 | 10-12 |
| Ex. 12 | Balance | 2 | 3.00 | 50 | G | G | 10-12 | A | G | G | G | A | 198-410 | 10-12 | 10-12 |
| Ex. 13 | Balance | 10 | 0.02 | 30 | G | G | 10-12 | A | G | G | G | A | 198-390 | 10-12 | 10-12 |
| Ex. 14 | Balance | 10 | 0.05 | 30 | G | G | 10-15 | A | G | G | G | A | 198-390 | 10-15 | 10-15 |
| Ex. 15 | Balance | 10 | 0.10 | 25 | G | G | 15-20 | A | G | G | G | A | 198-390 | 15-20 | 15-20 |
| Ex. 16 | Balance | 10 | 0.50 | 30 | G | G | 15-20 | A | G | G | G | A | 198-390 | 20-25 | 15-20 |
| Ex. 17 | Balance | 10 | 1.00 | 50 | G | G | 10-15 | A | G | G | G | A | 198-390 | 20-25 | 10-15 |
| Ex. 18 | Balance | 10 | 3.00 | 50 | G | G | 10-15 | A | G | G | G | A | 198-390 | 20-25 | 10-15 |
| Ex. 19 | Balance | 20 | 0.02 | 25 | G | G | 10-15 | A | G | G | G | A | 198-380 | 10-15 | 10-15 |
| Ex. 20 | Balance | 20 | 0.05 | 25 | G | G | 15-20 | A | G | G | G | A | 198-380 | 15-20 | 15-20 |
| Ex. 21 | Balance | 20 | 0.10 | 25 | G | G | 20-25 | A | G | G | G | A | 198-380 | 20-25 | 20-25 |
| Ex. 22 | Balance | 20 | 0.50 | 25 | G | G | 20-25 | A | G | G | G | A | 198-380 | 20-25 | 20-25 |
| Ex. 23 | Balance | 20 | 1.00 | 35 | G | G | 20-25 | A | G | G | G | A | 198-380 | 20-25 | 20-25 |
| Ex. 24 | Balance | 20 | 3.00 | 35 | G | G | 20-25 | A | G | G | G | A | 198-380 | 20-25 | 20-25 |
| Ex. 25 | Balance | 30 | 0.02 | 25 | G | G | 10-15 | A | G | G | G | A | 198-370 | 10-15 | 15-20 |
| Ex. 26 | Balance | 30 | 0.05 | 25 | G | G | 15-20 | A | G | G | G | A | 198-370 | 15-20 | 20-25 |
| Ex. 27 | Balance | 30 | 0.10 | 20 | G | G | 20-25 | A | G | G | G | A | 198-370 | 15-20 | 20-25 |
| Ex. 28 | Balance | 30 | 0.50 | 20 | G | G | 20-25 | A | G | G | G | A | 198-370 | 20-25 | 20-25 |
| Ex. 29 | Balance | 30 | 1.00 | 25 | G | G | 15-20 | A | G | G | G | A | 198-370 | 20-25 | 20-25 |
| Ex. 30 | Balance | 30 | 3.00 | 25 | G | G | 15-20 | A | G | G | G | A | 198-370 | 20-25 | 20-25 |
| Com. Ex. 3 | 100 | — | — | 35 | G | P | 1 | — | — | — | — | — | — | 1 | 1 |
| Com. Ex. 4 | — | 100 | — | 10 | G | G | <1 | — | — | — | — | — | — | <1 | <1 |

TABLE 3

| | Components (% by mass) | | | Hardness (Hv) | Workability into wire | Degree of white rust occurrence [no heat treatment] | Time period until red rust occurred [no heat treatment] | Salt spray — Evaluation of the time period until red rust occurred | | | | | Heat treatment temperature range in which the corrosion prevention effect was improved (° C.) | Immersion in tap water Time period until red rust occurred [no heat treatment] | Immersion in sulfuric acid Time period until red rust occurred [no heat treatment] |
|---|---|---|---|---|---|---|---|---|---|---|---|---|---|---|---|
| | | | | | | | | Addition amounts of Ti, Co, Ni and P (% by mass) [no heat treatment] | | | | | | | |
| | Zn | Sn | Mg | | | | | 0.001 | 0.01 | 0.1 | 1 | 3 | | | |
| Ex. 31 | Balance | 40 | 0.02 | 25 | G | G | 10-12 | A | G | G | G | A | 198-350 | 10-12 | 10-15 |
| Ex. 32 | Balance | 40 | 0.05 | 25 | G | G | 10-15 | A | G | G | G | A | 198-350 | 10-15 | 15-20 |
| Ex. 33 | Balance | 40 | 0.10 | 20 | G | G | 15-20 | A | G | G | G | A | 198-350 | 15-20 | 15-20 |

TABLE 3-continued

| | Components (% by mass) | | | Hardness (Hv) | Workability into wire | Degree of white rust occurrence [no heat treatment] | Salt spray | | | | | | Immersion in tap water Time period until red rust occurred [no heat treatment] | Immersion in sulfuric acid Time period until red rust occurred [no heat treatment] |
|---|---|---|---|---|---|---|---|---|---|---|---|---|---|---|
| | | | | | | | Time period until red rust occurred [no heat treatment] | Evaluation of the time period until red rust occurred | | | | | | |
| | | | | | | | | Addition amounts of Ti, Co, Ni and P (% by mass) [no heat treatment] | | | | | Heat treatment temperature range in which the corrosion prevention effect was improved (° C.) | | |
| | Zn | Sn | Mg | | | | | 0.001 | 0.01 | 0.1 | 1 | 3 | | | |
| Ex. 34 | Balance | 40 | 0.50 | 25 | G | G | 15-20 | A | G | G | G | A | 198-350 | 15-20 | 15-20 |
| Ex. 35 | Balance | 40 | 1.00 | 30 | G | G | 10-15 | A | G | G | G | A | 198-350 | 15-20 | 15-20 |
| Ex. 36 | Balance | 40 | 3.00 | 30 | G | G | 10-15 | A | G | G | G | A | 198-350 | 15-20 | 15-20 |
| Ex. 37 | Balance | 48 | 0.02 | 25 | G | G | 10-12 | A | G | G | G | A | 198-340 | 10-12 | 10-12 |
| Ex. 38 | Balance | 48 | 0.05 | 25 | G | G | 10-12 | A | G | G | G | A | 198-340 | 10-12 | 10-12 |
| Ex. 39 | Balance | 48 | 0.10 | 20 | G | G | 10-15 | A | G | G | G | A | 198-340 | 10-15 | 10-15 |
| Ex. 40 | Balance | 48 | 0.50 | 20 | G | G | 10-15 | A | G | G | G | A | 198-340 | 10-15 | 10-15 |
| Ex. 41 | Balance | 48 | 1.00 | 25 | G | G | 10-12 | A | G | G | G | A | 198-340 | 10-12 | 10-12 |
| Ex. 42 | Balance | 48 | 3.00 | 25 | G | G | 10-12 | A | G | G | G | A | 198-340 | 10-12 | 10-12 |
| Com. Ex. 5 | Balance | 1 | 0.10 | 35 | G | A | 5-6 | A | G | E | G | A | 198-410 | 5-6 | 4-5 |
| Com. Ex. 6 | Balance | 2 | 0.01 | 35 | G | A | 7-8 | A | G | G | G | A | 198-410 | 7-8 | 7-8 |
| Com. Ex. 7 | Balance | 2 | 5.00 | 130 | P | G | 5-6 | A | G | G | G | A | 198-410 | 5-6 | 5-6 |
| Com. Ex. 8 | Balance | 10 | 0.01 | 30 | G | G | 8-10 | A | G | G | G | A | 198-390 | 8-10 | 8-10 |
| Com. Ex. 9 | Balance | 10 | 5.00 | 120 | P | G | 4-5 | A | G | G | G | A | 198-390 | 6-7 | 4-5 |
| Com. Ex. 10 | Balance | 20 | 0.01 | 30 | G | G | 8-10 | A | G | G | G | A | 198-380 | 8-10 | 8-10 |
| Com. Ex. 11 | Balance | 20 | 5.00 | 100 | P | G | 7-8 | A | G | G | G | A | 198-380 | 7-8 | 6-7 |
| Com. Ex. 12 | Balance | 30 | 0.01 | 30 | G | G | 8-10 | A | G | G | G | A | 198-370 | 8-10 | 8-10 |
| Com. Ex. 13 | Balance | 30 | 5.00 | 70 | P | G | 7-8 | A | G | G | G | A | 198-370 | 7-8 | 6-7 |
| Com. Ex. 14 | Balance | 40 | 0.01 | 30 | G | G | 8-10 | A | G | G | G | A | 198-350 | 8-10 | 8-10 |
| Com. Ex. 15 | Balance | 40 | 5.00 | 70 | P | G | 7-8 | A | G | G | G | A | 198-350 | 7-8 | 6-7 |
| Com. Ex. 16 | Balance | 48 | 0.01 | 25 | G | G | 7-8 | A | G | G | G | A | 198-340 | 7-8 | 7-8 |
| Com. Ex. 17 | Balance | 48 | 5.00 | 50 | P | G | 5-6 | A | G | G | G | A | 198-340 | 5-6 | 5-6 |
| Com. Ex. 18 | Balance | 50 | 0.10 | 20 | G | G | 7-8 | A | G | G | G | A | 198-340 | 7-8 | 7-8 |
| Com. Ex. 3 | 100 | — | — | 35 | G | P | 1 | — | — | — | — | — | — | 1 | 1 |
| Com. Ex. 4 | — | 100 | — | 10 | G | G | <1 | — | — | — | — | — | — | <1 | <1 |

In Examples 7 to 42 and Comparative Examples 5 to 18, when Ti, Co, Ni and P were added each alone and the salt spray test was performed, the same evaluation results were obtained, by varying the addition amount, on the time periods until red rust occurred. Therefore, also in Tables 2 and 3 in the same manner as in Table 1, for simplicity, only one typical example is shown for each of Examples 7 to 42 and Comparative Examples 5 to 18. Specifically, this means that in each of Examples 7 to 42 and Comparative Examples 5 to 18, in any of the cases in which any one of Ti, Co, Ni and P was added, when the addition amount thereof was varied as 0.001, 0.01, 0.1, 1 and 3% by mass, the same results were obtained for all these elements as shown in Tables 2 and 3.

Examples 43 to 53

As shown in Table 4, in each of Examples 43 to 53, a Zn—Sn—Mg wire was used as a first wire and a Zn wire was used as a second wire, and simultaneously the first wire and the second wire were arc sprayed. The results thus obtained are shown in Table 4. In this tabular presentation, in the same manner as in above-described Examples, in each of Examples 43 to 53, when Ti, Co, Ni and P were added and the salt spray test was performed, in any of the cases in which any one of Ti, Co, Ni and P was singly added, the same evaluation results were obtained, by varying the addition amount, on the time periods until red rust occurred. Therefore, also in Table 4, for simplicity, only one typical example is shown for each of Examples 43 to 53.

TABLE 4

| | Components (% by mass) | | | | Hardness (Hv) | Workability into wire | Degree of white rust occurrence [no heat treatment] | Time period until red rust occurred [no heat treatment] | Salt spray Evaluation of the time period until red rust occurred Addition amounts of Ti, Co, Ni and P (% by mass) [no heat treatment] | | | | | Heat treatment temperature range in which the corrosion prevention effect was improved (° C.) | Immersion in tap water Time period until red rust occurred [no heat treatment] | Immersion in sulfuric acid Time period until red rust occurred [no heat treatment] |
|---|---|---|---|---|---|---|---|---|---|---|---|---|---|---|---|---|
| | Zn | Sn | Mg | Spray conditions | | | | | 0.001 | 0.01 | 0.1 | 1 | 3 | | | |
| Ex. 43 | Balance | 2 | 0.02 | Zn—4Sn—0.04Mg wire and Zn wire | — | — | G | 12-14 | A | G | G | G | A | 198-410 | 12-14 | 12-14 |
| Ex. 44 | Balance | 2 | 3.00 | Zn—4Sn—6.0Mg wire and Zn wire | — | — | G | 12-14 | A | G | G | G | A | 198-410 | 12-14 | 12-14 |
| Ex. 45 | Balance | 10 | 0.02 | Zn—20Sn—0.04Mg wire and Zn wire | — | — | G | 12-14 | A | G | G | G | A | 198-380 | 12-14 | 12-14 |
| Ex. 46 | Balance | 10 | 3.00 | Zn—20Sn—6.0Mg wire and Zn wire | — | — | G | 15-20 | A | G | G | G | A | 198-380 | 25-30 | 15-20 |
| Ex. 47 | Balance | 20 | 0.02 | Zn—40Sn—0.04Mg wire and Zn wire | — | — | G | 15-20 | A | G | G | G | A | 198-350 | 15-20 | 15-20 |
| Ex. 48 | Balance | 20 | 3.00 | Zn—40Sn—6.0Mg wire and Zn wire | — | — | G | 25-30 | A | G | G | G | A | 198-350 | 25-30 | 25-30 |
| Ex. 49 | Balance | 30 | 0.02 | Zn—60Sn—0.04Mg wire and Zn wire | — | — | G | 15-20 | A | G | G | G | A | 198-340 | 15-20 | 20-25 |
| Ex. 50 | Balance | 30 | 3.00 | Zn—60Sn—6.0Mg wire and Zn wire | — | — | G | 20-25 | A | G | G | G | A | 198-340 | 25-30 | 25-30 |
| Ex. 51 | Balance | 40 | 0.02 | Zn—80Sn—0.04Mg wire and Zn wire | — | — | G | 12-14 | A | G | G | G | A | 198-290 | 12-14 | 15-20 |
| Ex. 52 | Balance | 40 | 3.00 | Zn—80Sn—6.0Mg wire and Zn wire | — | — | G | 15-20 | A | G | G | G | A | 198-290 | 20-25 | 20-25 |
| Ex. 53 | Balance | 48 | 0.02 | Zn—96Sn—0.4Mg wire and Zn wire | — | — | G | 12-14 | A | G | G | G | A | 198-220 | 12-14 | 12-14 |

As can be seen from Table 1, in Examples 1 to 6 in each of which a Zn—Sn alloy was sprayed, the used alloys were able to be wiredrawn without problems and all the used alloys were able to yield a wire of 1.6 mm in diameter.

In each of Examples 1 to 6, the degree of white rust occurrence was low and, additionally the time period until red rust occurred was long, hence sufficient corrosion prevention performance was attained. Because of the use of the Zn—Sn alloys, Examples 1 to 6 were free from problems associated with health. In each of Examples 1 to 6, the time period until red rust occurred was approximately as excellent as the time period concerned of the heretofore known Zn-15Al alloy. The cases where at least any one of Ti, Co, Ni and P was added to the Zn—Sn alloy and the cases where a heat treatment was applied after spraying were able to further improve the corrosion prevention property. With respect to the heat treatment, specifically, when the heat treatment was performed at a temperature falling in a range equal to or higher than the eutectic temperature, namely, 198° C., of the alloy forming the sprayed coating and lower than the melting point of the alloy sprayed coating, the corrosion prevention effect was able to be improved by a heat treatment for 30 minutes; the corrosion prevention property when immersion in tap water was made and the corrosion prevention property when the immersion in sulfuric acid was made were also excellent.

On the contrary, in Comparative Example 1, the mixing proportion of Sn was lower than the range of the present invention, hence the mixing proportion of Zn was correspondingly higher, and accordingly corresponding white rust occurrence was observed. Because the mixing proportion of Sn was lower than the range of the present invention, Sn hardly displayed the function of suppressing the elution of Zn, and hence the time period until red rust occurred was extremely shorter as compared to Examples 1 to 6.

In Comparative Example 2, the mixing proportion of Sn was, in contrast, larger than the range of the present invention, but the time period until red rust occurred was similarly shorter as compared to Examples 1 to 6.

In Comparative Example 3, only Zn was sprayed, and hence the degree of white rust occurrence was further higher and the time period until red rust occurred was also shorter as compared to Comparative Example 1.

In Comparative Example 4, only Sn was sprayed, and hence the time period until red rust occurred was further shorter as compared to Comparative Example 2.

As can be seen from Tables 2 and 3, in Examples 7 to 42 in each of which a Zn—Sn—Mg alloy was sprayed, the used alloys were able to be wiredrawn without problems and all the used alloys were each able to yield a wire of 1.6 mm in diameter.

In each of Examples 7 to 42, the degree of white rust occurrence was low and, additionally the time period until red rust occurred was long, hence sufficient corrosion prevention performance was attained. In each of Examples 7 to 42, the time period until red rust occurred was approximately as excellent as or more excellent than the time period concerned of the known Zn-15Al alloy. The cases where at least any one of Ti, Co, Ni and P was added to the Zn—Sn—Mg alloy and the cases where a heat treatment was applied after spraying were able to further improve the corrosion prevention property. With respect to the heat treatment, specifically, when the heat treatment was performed at a temperature falling in a range equal to or higher than the eutectic temperature, namely, 198° C., of the alloy forming the sprayed coating and lower than the melting point of the alloy sprayed coating, the corrosion prevention effect was able to be improved by a heat treatment for 30 minutes; the corrosion prevention property when immersion in tap water was made and the corrosion prevention property when the immersion in sulfuric acid was made were also excellent.

On the contrary, in Comparative Example 5, as shown in Table 3, the mixing proportion of Mg offered no problem; however, the mixing proportion of Sn was lower than the range of the present invention, hence the mixing proportion of Zn was correspondingly higher and accordingly corresponding white rust occurrence was found. Additionally, the time period until red rust occurred was shorter as compared to Examples 7 to 42.

In each of Comparative Examples 6, 8, 10, 12, 14 and 16, the mixing proportion of Sn offered no problem; however, the mixing proportion of Mg was lower than the range of the present invention, Mg hardly displayed the function of suppressing the elution of Zn, and hence the time period until red rust occurred was shorter as compared to Examples 7 to 12, 13 to 18, 19 to 24, 25 to 30, 31 to 36 and 37 to 42.

In Comparative Examples 6, 8, 10, 12, 14 and 16 as compared respectively to Examples 1, 2, 3, 4, 5 and 6, which were respectively the same in the mixing proportions of Zn and Sn as these Comparative Examples, although a slight amount of Mg was added, the time period until red rust occurred was made rather shorter. The reasons for this fact are not clear; probably, the addition amount of Mg was very small, and hence no effect of the addition of Mg was manifested, and some factors leading to poor results functioned.

In each of Comparative Examples 7, 9, 11, 13, 15 and 17, the mixing proportion of Sn offered no problem; however, the mixing proportion of Mg was higher than the range of the present invention, and hence the corrosion prevention property was extremely degraded. Consequently, red rust occurred in an extremely short time period as compared to Examples 7 to 42.

In Comparative Example 18, the mixing proportion of Mg offered no problem; however, the mixing proportion of Sn was higher than the range of the present invention, and hence the time period until red rust occurred was shorter as compared to Examples 7 to 42.

In Examples 43, 44, 45, 46, 47, 48, 49 and 50, for the purpose of obtaining the coatings having the same compositions as the compositions respectively in Examples 7, 12, 13, 18, 19, 24, 25 and 30, the Zn—Sn—Mg wires each having a doubled amount of Sn and a doubled amount of Mg in relation to the corresponding Example and the Zn wire including only Zn were used. Consequently, it was verified that in any of Examples 43 to 50, as compared to the corresponding Examples 7, 12, 13, 18, 19, 24, 25 and 30, the time period until red rust occurred due to the immersion in tap water and the time period until red rust occurred due to the immersion in sulfuric acid were longer, hence the corrosion prevention performance was further improved.

Also in each of Examples 51 to 53, in the same manner as in Examples 43 to 50, the time period until red rust occurred due to the immersion in tap water and the time period until red rust occurred due to the immersion in sulfuric acid were both long, hence the corrosion prevention performance was excellent.

Although no description is made in Tables 1 to 4, in the case where to the Zn—Sn alloy or the Zn—Sn—Mg alloy, at least any one of Ti, Co, Ni and P was added, and after spraying, a heat treatment was performed at a temperature falling in a range equal to or higher than the eutectic temperature, namely, 198° C., of the alloy forming the sprayed coating and lower than the melting point of the alloy sprayed coating, the corrosion prevention property was able to be further improved.

Example 54

Hereinafter, an example of the process for production of an alloy wire of the present invention is described.

By using an apparatus shown in FIG. 1, under the below-described conditions, an alloy wire 105 in which crystals were refined, the ductility thereof was improved and the diameter thereof was 10 mm was obtained. Then, the alloy wire 105 was worked into an alloy wire having a diameter of 1.6 mm with a not-shown wiredrawing machine.

Specifically, in the above-described production process, the timing of spraying cooling water was altered and quenching was performed. More specifically, as shown in Table 5, the timing of spraying cooling water (hereinafter, referred to as "water cooling timing") was varied, and thus the specimens 1 to 4 were produced.

In other words, Zn, Sn and Mg were melted at 450° C., and these molten materials were mixed in such a way that the content of Sn was 30% by mass, the content of Mg was 0.3% by mass and the balance was composed of Zn to yield a molten alloy. With reference to the timing (hereinafter, referred to as "arrival timing") at which the molten alloy 103 discharged from the molten alloy outlet 116 of the crucible 115 shown in FIG. 1 arrived at the groove 112, the water cooling timing was varied. Specifically, the position of the spray nozzle 113 shown in FIG. 1 was adjusted along the rotation direction of the casting wheel 111 so as to give a required water cooling timing.

Each of the obtained specimens 1 to 4 was subjected to a tensile test to measure the tensile strength and the elongation, also subjected to a bending test to measure the load and the breaking angle, and subjected to a measurement of the Vickers hardness Hv; the average values over the values obtained by six times repeated measurements were adopted as the measurement results.

Figure 2:
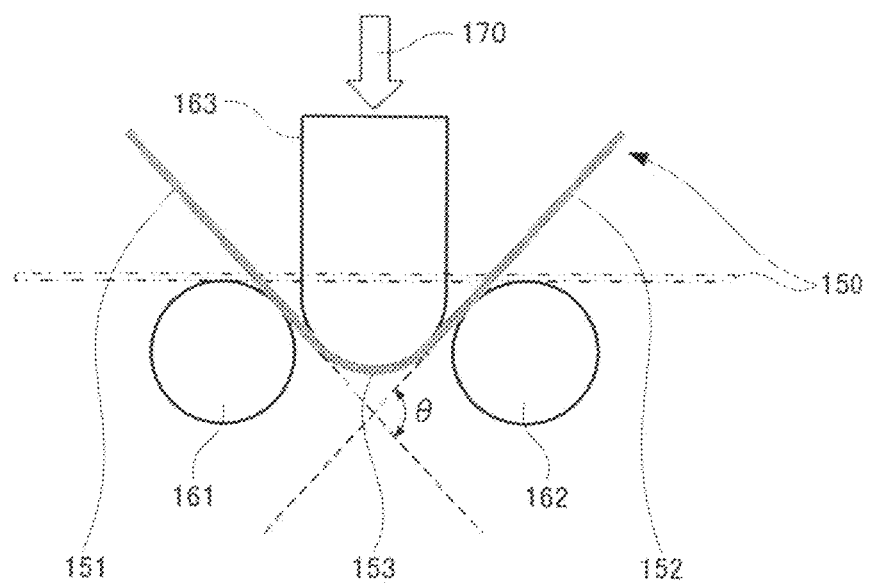
FIG. 2 is a view illustrating a bending test method based on the present invention.

The bending test was performed according to JIS Z 2248 "Bending test method for metal material." Specifically, as shown in FIG. 2, the specimen 150 having a diameter of 1.6 mm was made to take a position with the axis direction thereof to be horizontal and was placed, on a pair of supports 161 and 162 each having a diameter of 10 mm and being disposed at a certain horizontal interval, so as to bridge over this pair. A pushing metal rod 163 having an end cross-sectional shape of a semicircle of 5 mm in radius vertically applied a load 170 to the specimen 150 at a position between the support 161 and the support 162.

Thus, as shown in FIG. 2, the specimen 150 was deformed into a V-shape. At the time of the breaking of the specimen 150 due to the deformation, the bending angle θ was measured, wherein the bending angle θ was an angle formed by the crossing of the extended line of the portion 151 of the specimen 150 in contact with one of the supports, namely, the support 161 and the extended line of the portion 152 of the specimen 150 in contact with the other of the supports, namely, the support 162. It is to be noted that the bending angle θ was an angle while the load 170 was being applied, but not the angle after the load was removed. At this time, the occurrence and nonoccurrence of cracks, flaws and other defects in the curved outer portion of the curved portion 153 of the specimen 150 were examined.

(Specimen 1)

An alloy wire produced under the conditions without water cooling was adopted as the specimen 1. In the specimen 1, the tensile strength was 125 N/mm² and the elongation was 1%; and when the bending test was performed, the specimen 1 was broken under a load of 20 N and at a bending angle θ of 40 degrees. The Vickers hardness Hv was found to be 26.

The evaluation results for the specimen 1 are shown in Table 5.

molten alloy 104 before the water cooling was 300 to 350° C., and the temperature of the wire 105 after the water cooling was 30 to 50° C. In the specimen 4, the tensile strength was 155 N/mm² and the elongation was 16%; and the bending test was performed, and consequently the specimen 4 was not broken under a load of 25 N and even at a bending angle θ of 180 degrees. The Vickers hardness Hv was found to be 35.

The evaluation results for the specimen 4 are shown in Table 5.

TABLE 5

| Specimen | Application or non-application of water cooling (Water cooling timing) | Temperature (° C.) | | Tensile test | | Bending test | | Hardness (Hv) |
|---|---|---|---|---|---|---|---|---|
| | | Before water cooling | After water cooling | Tensile strength (N/mm²) | Elongation (%) | Load (N) | Breaking angle (degrees) | |
| 1 | Not applied | — | — | 125 | 1 | 20 | 40 | 26 |
| 2 | Applied (30 seconds after discharge of molten alloy) | 200-250 | 20-40 | 154 | 10 | 25 | 150 | 35 |
| 3 | Applied (15 seconds after discharge of molten alloy) | 250-300 | 30-50 | 150 | 14 | 25 | No breaking at 180° | 35 |
| 4 | Applied (5 seconds after discharge of molten alloy) | 300-350 | 30-50 | 155 | 16 | 25 | No breaking at 180° | 35 |

(Specimen 2)

An alloy wire produced under the conditions with water cooling was adopted as the specimen 2. The water cooling timing was set at 30 seconds after the arrival timing of the molten alloy 103 at the groove 112 shown in FIG. 1. In the cooling, cooling water at normal temperature was continuously sprayed for 5 to 10 seconds. The temperature of the molten alloy 104 before the water cooling was 200 to 250° C., and the temperature of the wire 105 after the water cooling was 20 to 40° C. In the specimen 2, the tensile strength was 154 N/mm² and the elongation was 10%; and when the bending test was performed, the specimen 2 was broken under a load of 25 N and at a bending angle θ of 150 degrees. The Vickers hardness Hv was found to be 35.

The evaluation results for the specimen 2 are shown in Table 5.

(Specimen 3)

An alloy wire produced under the conditions with water cooling was adopted as the specimen 3. The water cooling timing was set at 15 seconds after the above-described arrival timing. In the cooling, cooling water at normal temperature was continuously sprayed for 5 to 10 seconds. The temperature of the molten alloy 104 before the water cooling was 250 to 300° C., and the temperature of the wire 105 after the water cooling was 30 to 50° C. In the specimen 3, the tensile strength was 150 N/mm² and the elongation was 140; and the bending test was performed, and consequently the specimen 3 was not broken under a load of 25 N and even at a bending angle θ of 180 degrees. The Vickers hardness Hv was found to be 35.

The evaluation results for the specimen 3 are shown in Table 5.

(Specimen 4)

Figure 3:
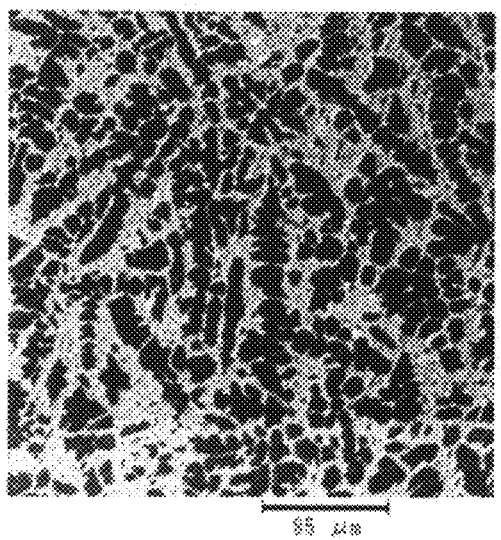
FIG. 3 is a view showing a result of an optical microscope observation of the microstructure of a specimen produced under the conditions without water cooling.

An alloy wire produced under the conditions with water cooling was adopted as the specimen 4. The water cooling timing was set at 5 seconds after the arrival timing. In the cooling, cooling water at normal temperature was continuously sprayed for 5 to 10 seconds. The temperature of the In addition to these measurements, a microstructure observation was also performed. FIG. 3 shows a result of an optical microscope observation of the microstructure of the specimen 1 produced under the conditions without water cooling. As shown in the figure, a dendritic microstructure generated by the dendritic precipitation of the zinc crystals was observed. In FIG. 3, black portions represent zinc crystals and the white portions represent the eutectic crystals.

Figure 4:
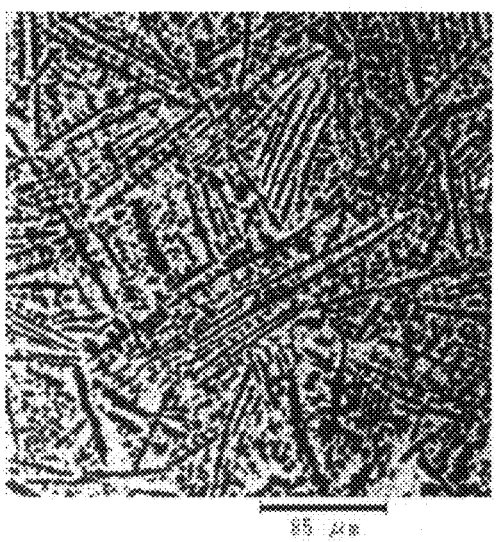
FIG. 4 is a view showing a result of an optical microscope observation of the microstructure of a specimen produced under the conditions with water cooling.

FIG. 4 shows a result of an optical microscope observation of the microstructure of the specimen 4 produced under the conditions with water cooling. As shown in the figure, an acicular microstructure generated by the acicular precipitation of the zinc crystals was observed. Further, the zinc crystals were finer as compared to the alloy wire of FIG. 3 produced under the conditions without water cooling.

As described above, when quenching was performed by spraying cooling water, the mechanical properties of the alloy wire were improved. Further, the earlier was the timing of the cooling water spraying, the better results were obtained. Specifically, as is clear from the measurement results of the tensile test, the specimens 2 to 4 produced under the conditions with water cooling were improved in tensile strength by about 20% and drastically improved in elongation as compared to the specimen 1 produced under the conditions without water cooling. Additionally, the specimens 2 to 4 produced under the conditions with water cooling were shown to be hardly broken, from the measurement results of the bending test, and the specimens 2 to 4 each showed a high Vickers hardness value.

Among the alloy wires produced in the similar manner under the conditions with water cooling, the specimen 3 for which the timing of the cooling water spraying was earlier than for the specimen 2 was more hardly broken than the specimen 2; the specimen 4 for which the timing of the cooling water spraying was earlier than for the specimen 3 was larger in elongation than the specimen 3.

Consequently, as described above, in the working of an alloy wire having a diameter of 10 mm into an alloy wire having a diameter of 1.6 mm with a wiredrawing machine, the occurrence of the wire breaking was observed when the specimen 1 produced under the conditions without water cooling was obtained, but no wire breaking occurred when the specimens 2 to 4 produced under the conditions with water cooling were obtained.

As described above, the production under the conditions with water cooling enabled to refine the zinc crystals and enabled to improve the mechanical properties of the alloy wire. Further, the adoption of the earlier timing of the cooling water spraying enabled to promote the refinement of the zinc crystals and to improve, in particular, the ductility.

The invention claimed is:

1. A cast-iron pipe provided with a corrosion prevention layer on an outside surface thereof by arc spraying,
   wherein the corrosion prevention layer comprises a Zn—Sn—Mg alloy sprayed coating comprising Sn in a content of more than 10% by mass and less than 40% by mass, Mg in a content of more than 0.05% by mass and less than 5% by mass and a balance composed of Zn, and aluminum is not included in the corrosion prevention layer and
   wherein a Zn wire is used in the arc spraying such that at least a portion of the Zn in the sprayed coating of the corrosion prevention layer is distributed independent of the Zn—Sn—Mg alloy in the sprayed coating of the corrosion prevention layer.

* * * * *

UNITED STATES PATENT AND TRADEMARK OFFICE
CERTIFICATE OF CORRECTION

PATENT NO. : 8,828,556 B2
APPLICATION NO. : 12/733569
DATED : September 9, 2014
INVENTOR(S) : Shimizu et al.

It is certified that error appears in the above-identified patent and that said Letters Patent is hereby corrected as shown below:

On the title page item [73], delete "Kuboto Corporation, Osaka (JP),"
insert --Kubota Corporation, Osaka (JP)--

Signed and Sealed this
Third Day of March, 2015

Michelle K. Lee
*Deputy Director of the United States Patent and Trademark Office*